(12) United States Patent
Kato et al.

(10) Patent No.: US 11,740,675 B2
(45) Date of Patent: Aug. 29, 2023

(54) POWER CONTROL APPARATUS FOR IN-VEHICLE CAMERA AND POWER CONTROL METHOD

(71) Applicant: Mitsubishi Electric Corporation, Tokyo (JP)

(72) Inventors: Yoichi Kato, Tokyo (JP); Tetsuya Oba, Tokyo (JP); Takuya Taniguchi, Tokyo (JP); Takuto Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/630,285

(22) PCT Filed: Sep. 2, 2019

(86) PCT No.: PCT/JP2019/034338
§ 371 (c)(1),
(2) Date: Jan. 26, 2022

(87) PCT Pub. No.: WO2021/044456
PCT Pub. Date: Mar. 11, 2021

(65) Prior Publication Data
US 2022/0283620 A1    Sep. 8, 2022

(51) Int. Cl.
*G06F 1/00* (2006.01)
*G06F 1/3206* (2019.01)
(Continued)

(52) U.S. Cl.
CPC ............ *G06F 1/3206* (2013.01); *G06F 1/206* (2013.01); *G06F 1/3296* (2013.01); *G06V 20/59* (2022.01)

(58) Field of Classification Search
CPC ...... G06F 1/3206; G06F 1/206; G06F 1/3296; G06F 1/26; G06V 20/59
See application file for complete search history.

(56) References Cited

U.S. PATENT DOCUMENTS

2015/0138359 A1    5/2015    Masui

FOREIGN PATENT DOCUMENTS

| JP | 2001-88609 A | 4/2001 |
| JP | 2013-226974 A | 11/2013 |

OTHER PUBLICATIONS

International Search Report for PCT/JP2019/034338 dated, Octobers, 2019 (PCT/ISA/210).

*Primary Examiner* — Nitin C Patel
(74) *Attorney, Agent, or Firm* — Sughrue Mion, PLLC; Richard C. Turner

(57) ABSTRACT

A power control apparatus for an in-vehicle camera includes a temperature sensor which measures the temperature in a camera unit; a temperature data acquisition section which acquires periodically measured temperature data; a predicted temperature calculation section which calculates a temperature gradient from the acquired temperature data group and, based on the temperature gradient, calculates a future predicted camera unit temperature; a power supply section which supplies power to an image processing section; a temperature determination section which determines whether predicted temperature is within an operation guarantee temperature of camera unit component parts; and a power supply control section which, based on a determination result, issues a control command to start or stop power supply to the component parts from the power supply section, the power supply being started or stopped with appropriate timing using the predicted temperature, thereby enabling expeditious protection of the component parts when at high temperature.

14 Claims, 18 Drawing Sheets

(51) Int. Cl.
*G06V 20/59* (2022.01)
*G06F 1/20* (2006.01)
*G06F 1/3296* (2019.01)

LOW GRADIENT OF TEMPERATURE

HIGH GRADIENT OF TEMPERATURE

LOW GRADIENT OF TEMPERATURE

HIGH GRADIENT OF TEMPERATURE

FIG. 8

| RANGE OF $k_n$ | $T_w$ |
|---|---|
| $0 > k_n \geq -0.1$ | 10 |
| $-0.1 > k_n \geq -0.3$ | 8 |
| $0.3 > k_n \geq -0.5$ | 6 |
| ⋮ | ⋮ |
| $1 > k_n \geq -1.5$ | 2 |

FIG. 16

| VEHICLE OPERATION INFORMATION | | | | CONVERGENCE TEMPERATURE [° C] | TIME CONSTANT τ [sec] |
|---|---|---|---|---|---|
| | OPERATION | AIR VOLUME | SET TEMPERATURE [° C] | | |
| AIR CONDITIONER OPERATION | AIR CONDITIONER ON | LARGE | 18-22 | 20 | 600 |
| | | | 22-26 | 24 | 600 |
| | | | 26-30 | 28 | 600 |
| | | MEDIUM | 18-22 | 20 | 800 |
| | | | 22-26 | 24 | 800 |
| | | | 26-30 | 28 | 800 |
| | | SMALL | 18-22 | 20 | 1000 |
| | | | 22-26 | 24 | 1000 |
| | | | 26-30 | 28 | 1000 |
| | AIR CONDITIONER OFF | | | VEHICLE EXTERIOR TEMPERATURE | |

POWER CONTROL APPARATUS FOR IN-VEHICLE CAMERA AND POWER CONTROL METHOD

CROSS REFERENCE TO RELATED APPLICATIONS

This application is a National Stage of International Application No. PCT/JP2019/034338 filed Sep. 2, 2019.

TECHNICAL FIELD

The present application relates to the field of a power control apparatus for an in-vehicle camera and a power control method.

BACKGROUND ART

In recent years, an in-vehicle camera for image capture has increasingly been mounted on an own vehicle in order to capture an image around the vehicle. In particular, the vehicle is mounted with an automatic collision prevention function which analyzes an image captured by a camera unit, which, being attached to the internal surface of the front windshield of the vehicle, is used to monitor ahead, and by distinguishing objects which are a person, another vehicle, and a physical body which may possibly come into collision with the own vehicle, causes a vehicle control device to operate the brake of the own vehicle as needed, and issues an instruction to avoid the collision. Also, the vehicle is mounted with an automatic lane keeping function which issues an instruction to steer the own vehicle so that, by the camera unit recognizing the left and right while lines which are drawn on the surface of a road to define a lane, the vehicle control device causes the own vehicle to keep automatically running along the lane.

In general, however, this kind of camera unit for monitoring ahead is often attached to the front windshield surface of the vehicle, so that there is the problem of being open to the influence of the sun's rays and/or the heat of radiation from outside.

In particular, in summertime, the vehicle interior temperature becomes very high due to strong sun's rays and/or to radiation heat from outside, meaning that an imaging element configuring the camera unit is thereby exposed to a very high temperature. In the case of driving the vehicle in this kind of high temperature state, when the camera unit is operated, it happens that the imaging element is used in the state of exceeding the operation guarantee temperature thereof, and a distortion occurs in a captured image, affecting an object recognition processing in some cases. As a result, there is a possibility that a malfunction occurs in which the vehicle control device automatically executes brake operation at a wrong timing or does not normally carry out vehicle operation which the vehicle control device should execute.

Hence, it is proposed that a temperature sensor is mounted adjacent to the imaging element, and power supply to a video circuit of the camera is stopped when at an abnormally high temperature which exceeds a threshold temperature defined in advance, thus seeking to protect the imaging element and stabilize the image quality (for example refer to PTL 1).

Also, it is proposed that when the measured temperature adjacent to the imaging element is equal to or lower than the preset threshold before starting to energize the imaging element, the energization of the imaging element is started, thereby suppressing the energization of the imaging element being started when at high temperature, protecting the imaging element (for example refer to PTL 2).

CITATION LIST

Patent Literature

PTL 1: JP-A-2001-88609
PTL 2: JP-A-2013-226974

SUMMARY OF INVENTION

Technical Problem

However, both in the power control device for an in-vehicle camera of PTL 1 and in the in-vehicle camera control device of PTL 2, the temperature adjacent to the imaging element is measured by a temperature sensor, and when the temperature exceeds a preset reference value, the energization of the imaging element is stopped, while when the temperature is equal to or lower than the reference value, the energization is started, but when the temperature varies widely or quickly depending on the environment of usage of the in-vehicle camera, there is a problem in that an error occurs in the timing at which to start the energization of the imaging element, which cannot afford to take sufficient measures to protect the imaging element.

The present application has been made to solve the above problem, and an object of the present application is to provide a power control apparatus for an in-vehicle camera and a power control method wherein and whereby even in the environment in which the temperature varies widely and quickly, the start or stop of power supply to component parts of the camera unit of the in-vehicle camera can be carried out with more appropriate timing, enabling the protection of the component parts of the in-vehicle camera unit.

Solution to Problem

In order to solve the above problem, the power control apparatus for an in-vehicle camera disclosed in the present application is characterized by including a temperature sensor which is installed inside a camera unit of an in-vehicle camera and which measures the temperature of the camera unit; a temperature data acquisition section which periodically acquires temperature data from the temperature sensor; a predicted temperature calculation section which, based on the temperature data, calculates a future predicted temperature of the camera unit; a power supply section which supplies power to component parts configuring the camera unit; a temperature determination section which determines whether or not the predicted temperature is within an operation guarantee temperature of the component parts; and a power supply control section which, based on a result of the determination of the temperature determination section, issues a control command to start or stop the power supply to the component parts from the power supply section.

Also, the power control method for an in-vehicle camera disclosed in the present application is characterized by including measuring the temperature of a camera unit of an in-vehicle camera by a temperature sensor installed inside the camera unit, periodically acquiring temperature data from the temperature sensor, calculating a future predicted temperature of the camera unit based on the temperature data, determining whether or not the predicted temperature is within an operation guarantee temperature of component parts of the camera unit, and carrying out the start or stop of the power supply to the component parts based on the determination.

Advantageous Effects of Invention

According to the power control apparatus for an in-vehicle camera and the power control method disclosed in the present application, there is an advantageous effect in that a future temperature of the camera unit of the in-vehicle camera is predicted based on the temperature data acquired from the temperature sensor, and the start or stop of the power supply to the component parts is implemented with appropriate timing so as to operate within the operation guarantee temperature of the component parts of the camera unit, thereby enabling the protection of the component parts of the camera unit to be carried out rapidly and accurately.

BRIEF DESCRIPTION OF DRAWINGS

FIG. 8 is a diagram showing an example of the correspondence table between the range of a temperature gradient and the temperature rise value, in the first embodiment.

FIG. 16 is a diagram showing an example of the relationship between vehicle operation information, a convergence temperature, and a time constant, in the second embodiment.

DESCRIPTION OF EMBODIMENTS

First Embodiment

Figure 1:
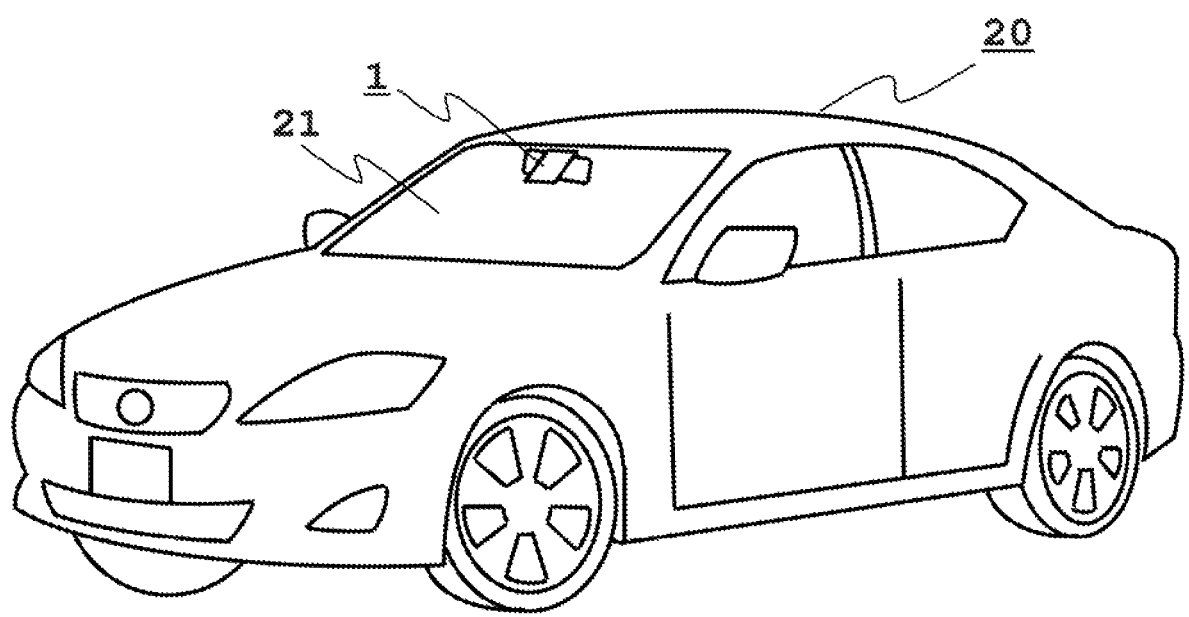
FIG. 1 is a view showing the outline of a vehicle installed with a camera unit including a power control apparatus for an in-vehicle camera according to the first embodiment.
Figure 2:
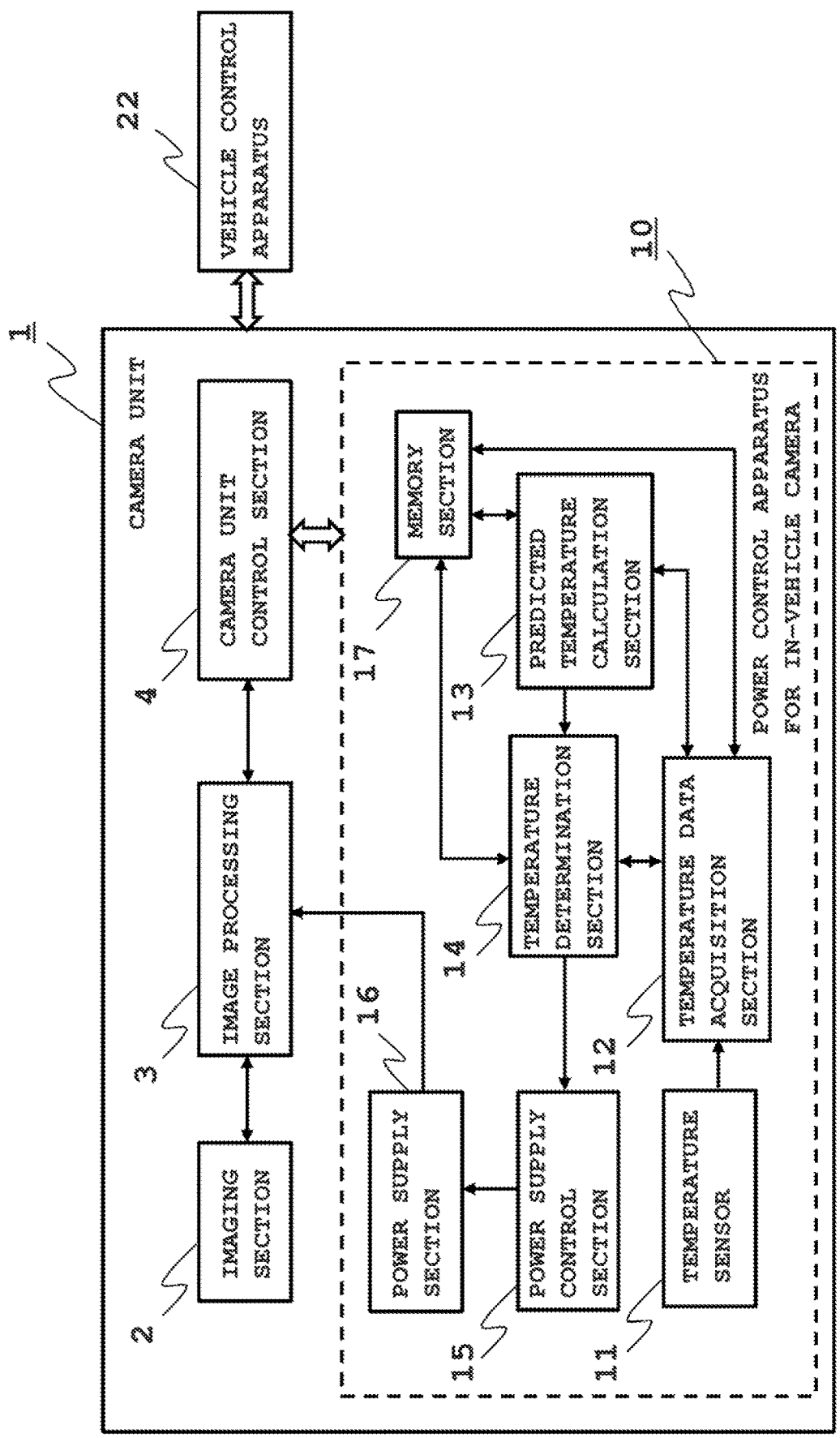
FIG. 2 is a functional block diagram showing the configuration of the camera unit including the power control apparatus for an in-vehicle camera according to the first embodiment.
Figure 3:
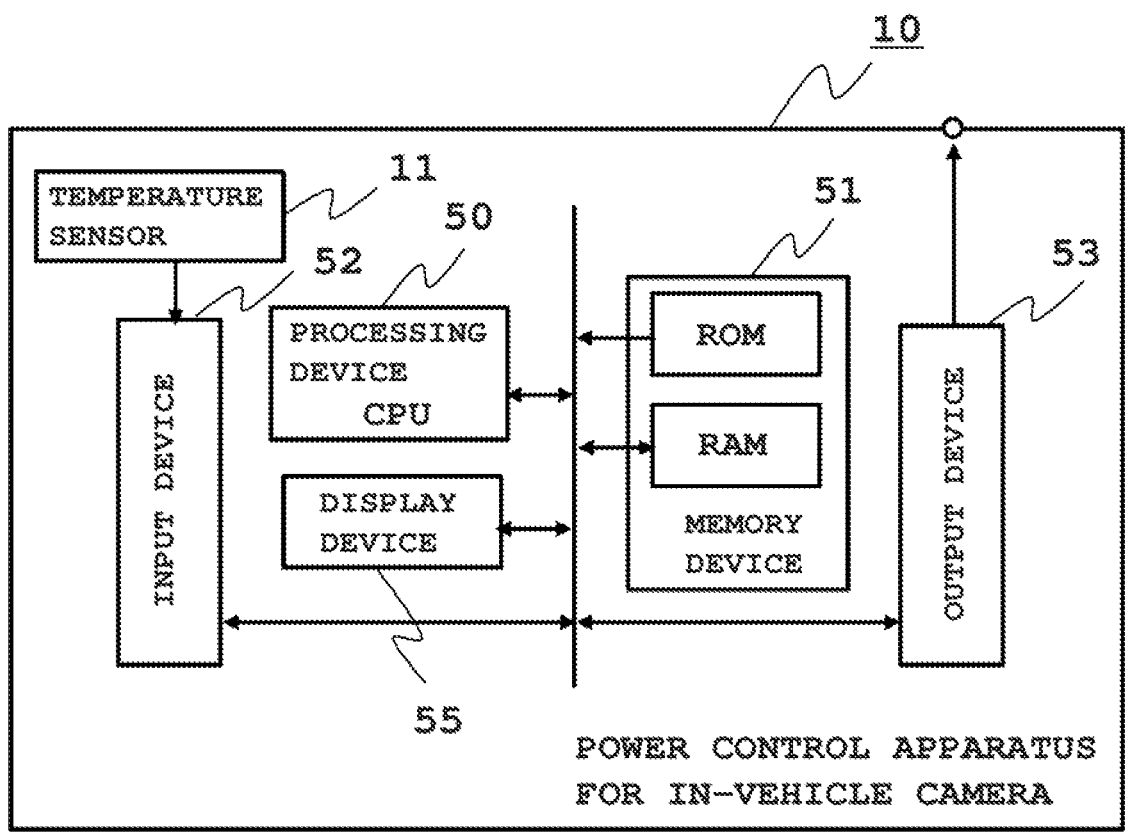
FIG. 3 is a schematic configuration diagram of the power control apparatus for an in-vehicle camera according to the first embodiment.
Figure 4:
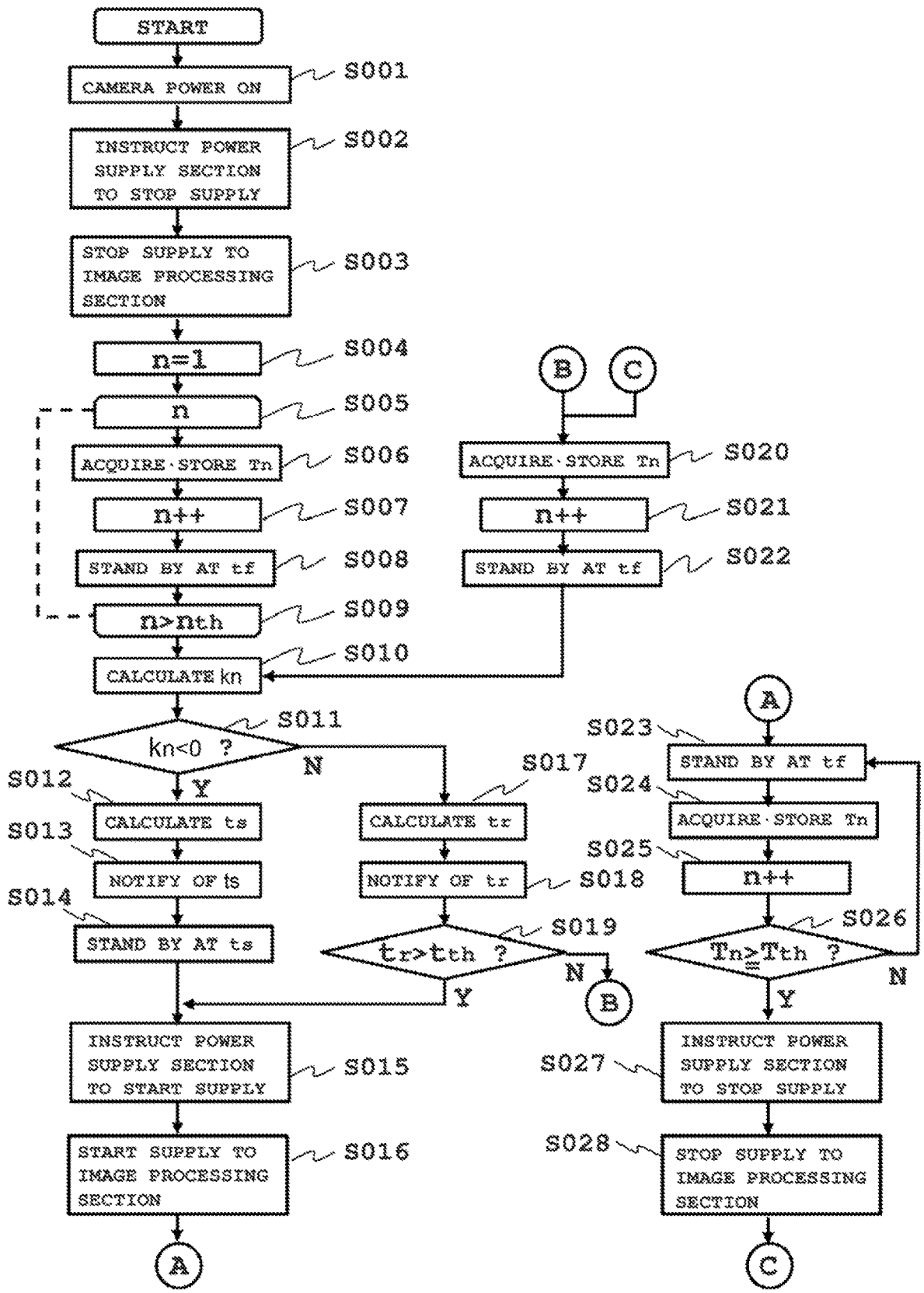
FIG. 4 is a flowchart showing the processing procedure of power supply control in the power control apparatus for an in-vehicle camera according to the first embodiment.
Figure 5:
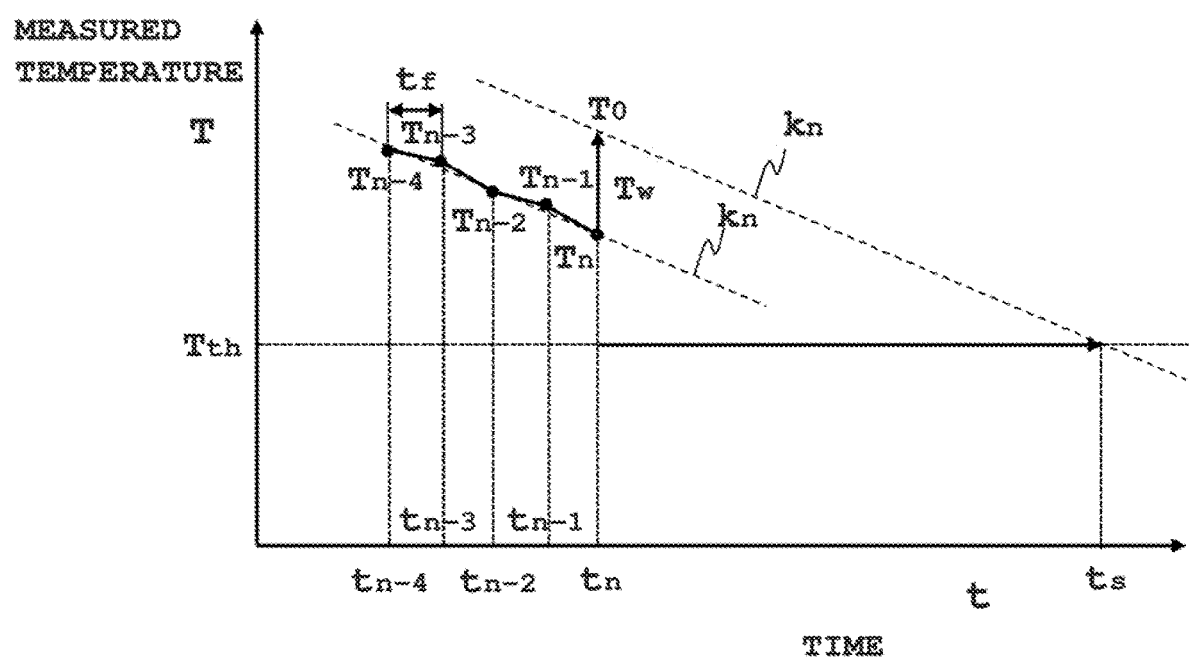
FIG. 5 is a diagram showing the relationship between a temperature gradient when the temperature drops and an estimated power supply start time point, in the first embodiment.
Figure 12:
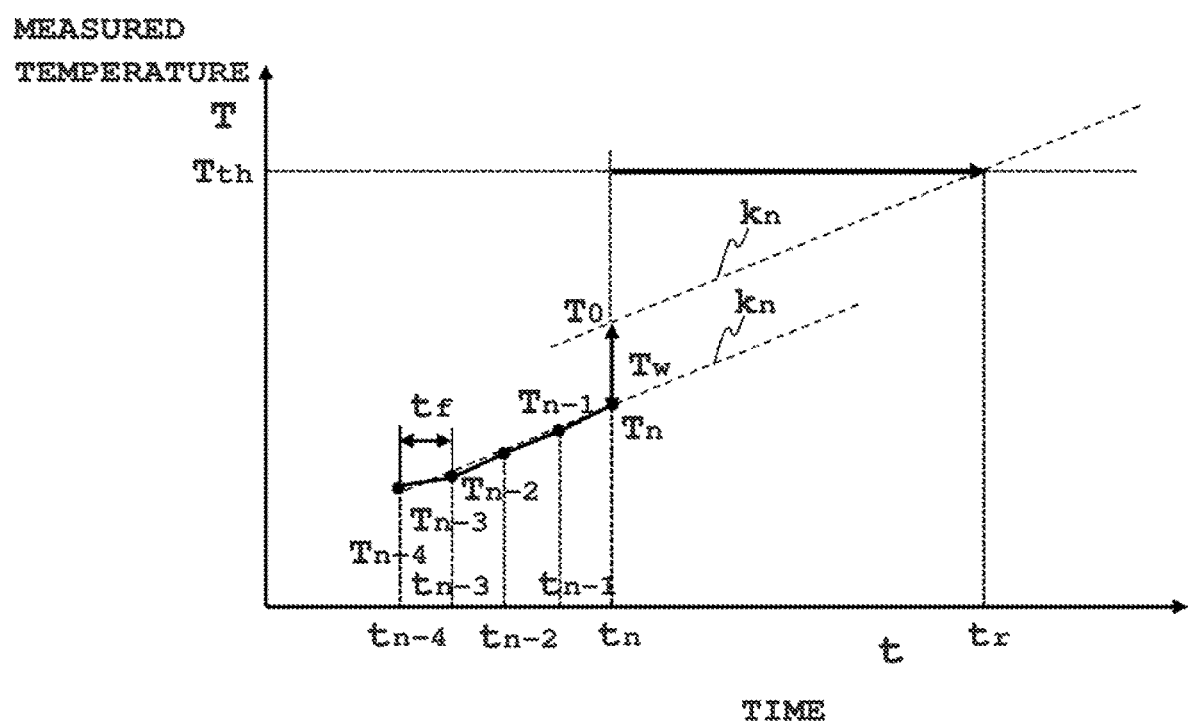
FIG. 12 is a diagram showing the relationship between the temperature gradient when the temperature rises and an estimated power supply stop time point, in the first embodiment.

FIG. 1 is a view showing the outline of a vehicle installed with a camera unit including a power control apparatus for an in-vehicle camera according to the first embodiment. FIG. 2 is a functional block diagram showing the configuration of the camera unit including the power control apparatus for an in-vehicle camera according to the first embodiment. FIG. 3 is a schematic configuration diagram of the power control apparatus for an in-vehicle camera according to the first embodiment. FIG. 4 is a flowchart showing the processing procedure of power supply control in the power control apparatus for an in-vehicle camera according to the first embodiment. FIG. 5 is a diagram showing the relationship between a temperature gradient when the temperature drops and an estimated power supply start time point, in the first embodiment. FIG. 12 is a diagram showing the relationship between a temperature gradient when the temperature rises and an estimated power supply stop time point, in the first embodiment.

As shown in FIG. 1, a camera unit 1 including the power control apparatus for an in-vehicle camera according to the first embodiment, being attached to the upper inside of a front windshield 21 of a vehicle 20, carries out monitoring ahead of the vehicle.

Next, a description will be given, using FIG. 2, of the configuration of the power control apparatus for an in-vehicle camera according to the first embodiment. The camera unit 1 includes an imaging section 2 which has an imaging element for capturing an image ahead of the vehicle, an image processing section 3 which processes the image captured by the imaging element, a camera unit control section 4 which transmits a result of image processing by the image processing section 3 to a vehicle control apparatus 22 of the vehicle 20 main body, and also which acquires vehicle operation information from the vehicle control apparatus 22, and carries out control of the entire camera unit 1, and a power control apparatus 10 for an in-vehicle camera which carries out control of the start and stop of the power supply to the imaging section 2 and image processing section 3. Also, the power control apparatus 10 for an in-vehicle camera includes a temperature sensor 11 which measures the temperature in the camera unit 1, a temperature data acquisition section 12 which acquires temperature data from the temperature sensor 11, a predicted temperature calculation section 13 which calculates a temperature gradient for predicting a future temperature from the temperature data, a temperature determination section 14 which determines the start and stop of the power supply to the image processing section 3 from the temperature data and temperature gradient, a power supply control section 15 which controls the power supply to the image processing section 3, a power supply section 16 which carries out the power supply to the image processing section 3, and a memory section 17 which stores the temperature data and temperature gradient.

Herein, also, the image processing section 3 may be also provided with the function of starting or stopping the power supply to the imaging section 2.

As shown in FIG. 3, the individual functional sections 12 to 17, or the like, which the power control apparatus 10 for an in-vehicle camera includes are realized by a processing device 50, a memory device 51, an input device 52, an output device 53, and a display device 54.

Herein, the processing device 50 may be dedicated hardware or may be a CPU (Central Processing Unit, which is also called a microprocessor, a microcomputer, a processor, or a DSP) which executes a program stored in the memory device 651.

When the processing device 50 is dedicated hardware, the processing device 50 corresponds to, for example, a single circuit, a multiple circuit, a programmed processor, a parallel programmed processor, an ASIC, an FPGA, or a combination of these. The respective functions of the temperature data acquisition section 12, the predicted temperature calculation section 13, the temperature determination section 14, and the power supply control section 15 may be each realized by the processing device 50, or the functions of the individual sections may be collectively realized by the processing device 50.

When the processing device 50 is a CPU, the functions of the temperature data acquisition section 12, predicted temperature calculation section 13, temperature determination section 14, and power supply control section 15 are realized by software, firmware, and a combination of software and firmware. Software or firmware is described as a processing program and stored in the memory device 51. The processing device 50 retrieves and executes the processing program stored in the memory device 51 and thereby realizes the functions of the individual sections. That is, the power control apparatus 10 for an in-vehicle camera includes the memory device 51 in which to store processing programs wherein a processing step in which to periodically acquire temperature data from the temperature sensor 11, a processing step in which to calculate a temperature gradient from the acquired group of temperature data, a processing step in which to predict a future temperature from the calculated temperature gradient and to determine whether or not the predicted temperature is within an operation guarantee temperature of the component parts of the camera unit, a processing step in which, based on a result of the determination, to issue a control command to start or stop the power supply to the component parts, and a processing step in which, based on the control command, to execute the start or stop of the power supply to the component parts, eventually come to be executed when the processing programs are executed by the processing device 50. Also, the processing programs can also be said to cause a computer to execute the procedures and methods of the temperature data acquisition section 12, predicted temperature calculation section 13, temperature determination section 14, and power supply control section 15. Herein, the memory device 51 corresponds to, for example, a non-volatile or volatile semiconductor memory, such as a RAM, a ROM, a flash memory, an EPROM, or an EEPROM, a magnetic disk, a flexible disk, an optical disk, a compact disk, a mini disk, or a DVD.

The function of the predicted temperature calculation section 13 may be configured so that one portion thereof is realized by dedicated hardware, and that one portion thereof is realized by software or firmware. For example, the function of the predicted temperature calculation section 13 can be realized by the processing device 50 as dedicated hardware, while the function of the temperature determination section 14 can be realized by the processing device 50 retrieving and executing the programs stored in the memory device 51.

Thus, the processing device 50 can realize the above-described individual functions with hardware, software, firmware, or a combination thereof.

The memory device 51, in addition to storing the programs with which to execute the above-described processing steps, stores the temperature data which the temperature data acquisition section 12 has acquired from the temperature sensor 11, the temperature gradient calculated from the temperature data in the predicted temperature calculation section 13, a threshold temperature to be utilized for determination in the temperature determination section 14, and an operation guarantee temperature, a storage guarantee temperature, and the like, of the parts configuring the camera unit 1.

Also, the input device 52 periodically acquires the temperature data measured by the temperature sensor 11 at predetermined time intervals. The output device 53, corresponding to the power supply control section 15 and to the power supply section 16, based on the control command from the power supply control section 15, executes the start or stop of the power supply to the imaging section and the like from the power supply section 16. The display device 55 appropriately displays a situation or the like in which to execute in the processing device 50.

The processing device 50 may double as the functions of the camera unit control section 4 and image processing section 3 which configure the camera unit 1.

In the present embodiment, a temperature gradient is obtained from the temperature data periodically acquired from the temperature sensor, the calculation of a future predicted temperature is carried out based on the temperature gradient, it is determined whether or not the predicted temperature is within the temperature range which guarantees the operation of the component parts configuring the camera unit, and based on a result of the determination, the start or stop of the power supply to the component parts is carried out, thereby protecting the component parts from a high temperature, thus suppressing the occurrence of a problem.

Next, a description will be given, with reference to the flowchart of FIG. 4, of the processing procedure of power supply control in the power control apparatus for an in-vehicle camera according to the first embodiment.

First, in order to start an operation of the vehicle, an engine is started, and the power supply to the camera unit 1 is started (Step S001). Herein, the power supply to the camera unit control section 4 is carried out. Subsequently, the camera unit control section 4 causes the power supply control section 15 of the power control apparatus 10 for an in-vehicle camera to issue a command to the power supply section 16 in order to stop the power supply to the image processing section 3 (Step S002). After that, the power supply section 16 stops the power supply to the image processing section 3 (Step S003). The power supply to the imaging section 2 is stopped in conjunction with that to the image processing section 3. The purpose for this is to prevent the occurrence of a problem of the component parts caused by the fact that, assuming that there is the case in which the surrounding temperature and the temperature of the component parts of the camera unit 1 have turned to a high temperature due to long-term parking or the like, the power supply to the image processing section 3 and to the imaging section 2 including the imaging element is started in the high temperature environment, and thereby the high temperature exceeds the operation guarantee temperature of the component parts of the camera unit 1. The power supply to the imaging section 2 and image processing section 3 may herein be stopped when only standby power is supplied, and neither an imaging operation nor an image processing operation is performed, keeping power consumption to a minimum.

Next, a description will be given of the processing procedure of determining, based on the present temperature and temperature state of the camera unit 1, whether or not to start the power supply to the image processing section 3 and imaging section 2 (refer to FIG. 4).

The temperature data acquisition section 12 executes the loop of Steps S005 to S009 in order to acquire from the temperature sensor 11, and to store in the memory section 17, a predetermined number n of samples of temperature data Tn-4, . . . , Tn-2, Tn-1, and Tn measured at a series of time points tn-4, . . . , tn-2, tn-1, and tn at predetermined time intervals tf.

For this reason, first, the initial value of a variable n of a counter is set to one (Step S004). The variable n is counted up every time the temperature sensor 11 acquires the measured temperature data, serving as a temperature measurement acquisition counter. After that, the temperature measurement by the temperature sensor 11 is implemented, entering the loop of sequentially acquiring a predetermined acquired number nth of items of temperature data (Step S005). Next, the temperature data Tn is acquired and stored (Step S006). The variable n is counted up (Step S007), and after standing by at the time interval tf of acquiring the temperature data (Step S008), it is determined whether or not the preset acquired number nth is reached, wherein when not reached, the above-mentioned is repeated, and when reached, the loop is finished (Step S009). Herein, a description will be given, as an example, of the case in which the acquired number nth is five.

Then, the predicted temperature calculation section 13, using the plurality of items of sequential temperature data, calculates a temperature gradient kn, and based on the temperature gradient kn, a predicted future temperature is stored in the memory section 17 (Step S010). As the temperature gradient kn, for example, the average value of the temperature gradients (Tn-1-Tn) between the individual sample time points tn-1 and tn only has to be taken as shown in the formula (1).

[Mathematical 1]

$$k_n = \frac{\sum_{k=n-n_{th}+2}^{n}(T_{k-1} - T_k)}{n_{th} + 2} \quad (1)$$

Next, the temperature determination section 14, in order to determine whether a present temperature Tn at a present time point tn has risen or dropped, determines whether or not the relationship of kn<0 is satisfied (Step S011).

Herein, in Step S011, when it is determined in the temperature determination section 14 that the relationship of kn<0 is satisfied, the temperature determination section 14 determines that the present temperature Tn at the present time point tn has dropped, calculating a power supply start estimated time point ts at which the future temperature predicted at the present time point tn reaches a temperature at which it is estimated that the power supply to the component parts of the camera unit is allowed to be started (Step S012).

FIG. 5 shows the present temperature Tn at the present time point tn, the temperature gradients kn, a temperature rise value Tw of the camera unit 1 main body, and the relationship between the threshold temperature Tth at which to start the power supply and the power supply start estimated time point ts. The case in which the number of samples is five is shown herein.

Specifically, the temperature determination section 14 adds the temperature rise value Tw of the in-vehicle camera unit main body, which is predicted by starting the power supply to the camera unit 1 main body, to the present temperature Tn at the present time point tn, and calculates the power supply start estimated time point ts at which it is estimated that this initial temperature T0 (=Tn+Tw) will drop along the temperature gradient kn (the upper side broken line of FIG. 5), and that the temperature of the component parts will fall below the threshold temperature Tth at which to start the power supply. The temperature rise value Tw predicted at the time of power supply and the threshold temperature Tth at which to start the power supply are stored in the memory section 17 in advance.

The threshold temperature Tth at which to start the power supply, based on the operation guarantee temperature of component parts, such as the imaging element and a microcomputer of the image processing section 3, which configure the camera unit 1, is set so as not to cause the camera unit 1 to produce a failure or another problem. Herein, when the power supply start estimated time point ts is set to the time point at which it is estimated, from the measured temperature Tn at the present time point to and the temperature gradient kn (the lower side broken line of FIG. 5), that the temperature of the component parts will fall below the threshold temperature Tth at which to start the power supply, the power supply start estimated time point ts, due to a temperature rise caused by the power consumption of the component parts of the camera unit when starting the power supply to the camera unit 1 main body, becomes earlier than the time point at which the power supply is actually allowed to be started, and there is a possibility that the power supply has to be stopped again, so that the initial temperature T0 (=Tn+Tw) wherein the temperature rise value Tw is added on top of the present temperature Tn at the present time point tn is used instead of the present time point tn when calculating the power supply start estimated time point ts using the temperature gradient kn. Thereby, it is possible to more appropriately calculate the power supply start estimated time point ts, enabling to prevent the power supply from being stopped immediately after the power supply starts.

Herein, the power supply start estimated time point ts can be expressed in the formula (2)

[Mathematical 2]

$$t_s = -\frac{T_n + T_w - T_{th}}{k_n} \quad (2)$$

Next, the temperature determination section 14 notifies the power supply control section 15 of the calculated power supply start estimated time point ts (Step S013).

The power supply control section 15 stands by until the notified power supply start estimated time point ts (Step S014).

After that, the power supply control section 15, after the power supply start estimated time point ts, issues an instruction to the power supply section 16 so as to start the power supply to the imaging section 2 and image processing section 3 (Step S015). The power supply section 16, based on the instruction, starts the power supply to the imaging section 2 and image processing section 3 (Step S016). Thereby, it is possible to start the imaging and image processing operation of the imaging section 2 and image processing section 3. When the power supply start estimated time point ts is zero or less, that is, when the present temperature Tn has already reached the temperature at which the power supply is allowed to be started, the imaging section 2 and the image processing section 3 may be operated by carrying out the power supply without standing by.

Figure 6A:
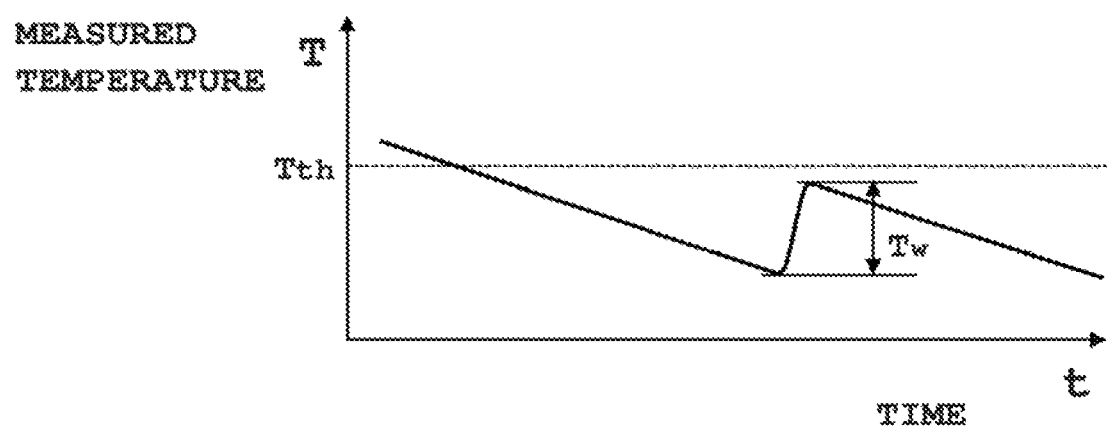
FIGS. 6A and 6B shows diagrams describing a temperature change at the power supply start time when the temperature rise value of the camera unit does not change, in the first embodiment.
Figure 6B:
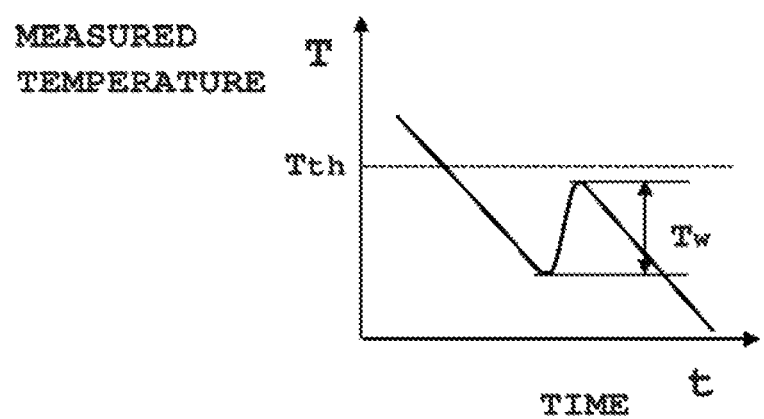
Figure 7A:
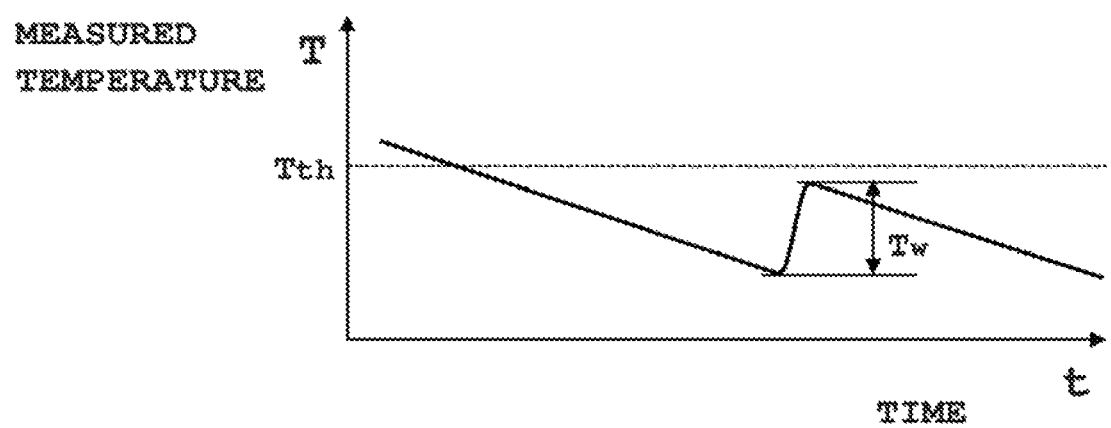
FIGS. 7A and 7B shows diagrams describing a temperature change at the power supply start time when the temperature rise value of the camera unit changes, in the first embodiment.
Figure 7B:
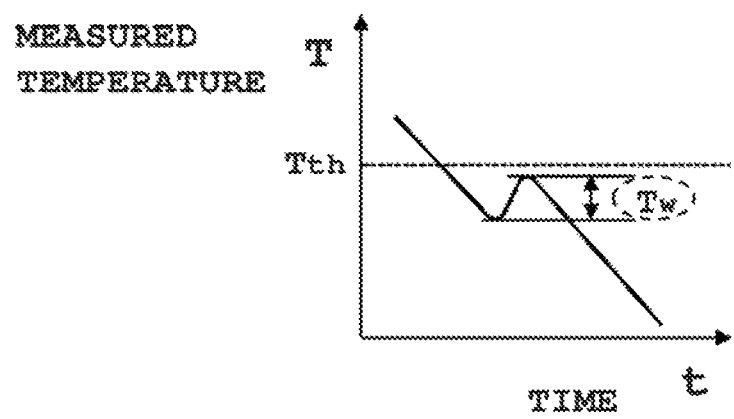

Herein, a further detailed description will be given of the power supply start estimated time point ts in consideration of the temperature rise value Tw produced by the heat generation caused along with the power consumption of the camera unit 1 main body. According to the above-described description, as shown in FIG. 6, it means that the power supply start estimated time point ts is calculated on the assumption that the temporary temperature rise value Tw produced by the heat generation of the camera unit 1 main body when starting the power supply is the same either when the temperature gradient kn is small in value (a) or when it is large in value (b). Actually, however, a temperature change caused by the heat generation of the camera unit 1 main body rises not in an instant but gradually over time, so that it is considered, as shown in FIG. 7, that the rate of the temperature rise is small when the temperature gradient kn is large in value (b). Consequently, when setting the temperature rise value Tw, the method may be adopted of causing the temperature rise value to change in response to the value of the temperature gradient kn other than setting a fixed value as described above. For example, the correspondence table shown in FIG. 8, which shows the relationship between the range of the temperature gradient kn and the temperature rise value Tw, is stored in the memory section 17 in advance, and the method may be adopted whereby in Step S012, the predicted temperature calculation section 13 selects the temperature rise value Tw with reference to the correspondence table and calculates the power supply start estimated time point ts.

Figure 9:
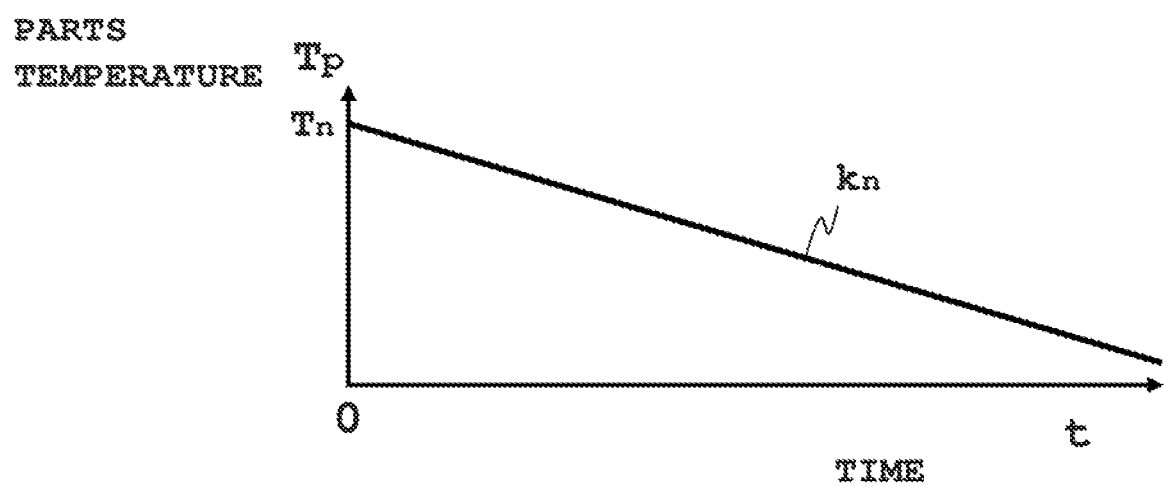
FIG. 9 is a reference diagram for calculating the temperature rise value Tw, showing the time change prediction of a parts temperature after calculating the temperature gradient, in the first embodiment.

Alternatively, for example, in the state in which there is either no change in the surrounding temperature or no wind, in case that the time variation characteristic of the parts temperature rise caused by the heat generation of the main body after the power supply can be expressed in mathematical form, the method may be adopted whereby the temperature rise value Tw is calculated using the formula in which the temperature gradient and the parts temperature rise are superimposed on each other. A description will be given, with reference to FIGS. 9 to 11, of one example of the calculation method. FIG. 9 shows a time variation prediction of the parts temperature after calculating the temperature gradient. A parts temperature Tp drops at the temperature gradient kn from the present measured temperature Tn. This can be expressed in the formula (3)

[Mathematical 3]

$$T_p = k_n t + T_n \quad (3)$$

Figure 10:
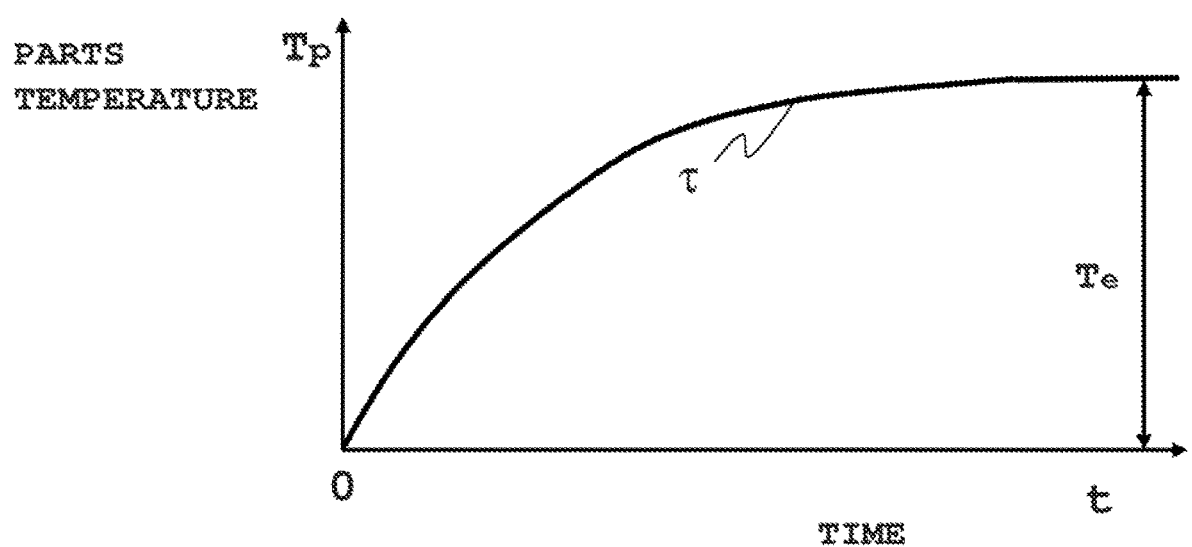
FIG. 10 is a reference diagram for calculating the temperature rise value Tw, showing the characteristics of a time change in parts temperature rise due to heat generation of the main body after power supply, in the first embodiment.

FIG. 10 shows the time variation characteristic of the parts temperature rise caused by the heat generation of the main body after the power supply. The parts temperature Tp rises with a time constant T as shown in the formula (4). Herein, Te shows an amount of heat generation.

[Mathematical 4]

$$T_p = T_e(1 - e^{-t/\tau}) \quad (4)$$

Figure 11:
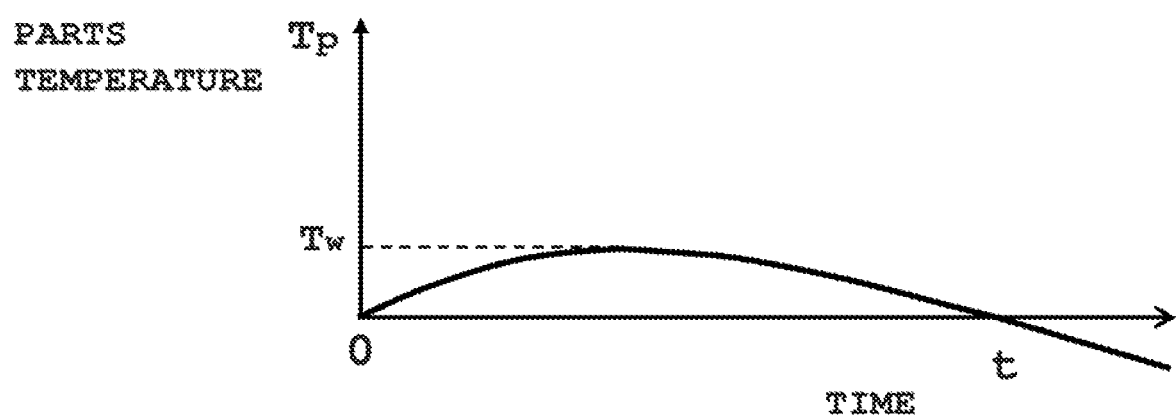
FIG. 11 is a diagram combining FIGS. 9 and 10, showing one example of the method of calculating the temperature rise value Tw in the first embodiment.

FIG. 11 is a diagram showing one example of the method of calculating the temperature rise value Tw. It is the diagram in which FIGS. 9 and 10 are combined together, and the parts temperature Tp varies as shown in the formula (5). Thereby, it is possible to calculate the temperature rise value Tw. The temperature rise value Tw can be expressed in the formula (6).

[Mathematical 5]

$$T_p = k_n t + T_n + T_e(1 - e^{-t/\tau}) \quad (5)$$

[Mathematical 6]

$$T_w = \tau k_n \log(\tau k_n / T_e) + T_n + T_e - \tau k_n \quad (6)$$

Also, the value of the temperature rise value Tw is not necessarily the rate of the temperature rise itself caused by the heat generation of the in-vehicle camera unit 1 main body, and may be, for example, made smaller than the rate. In this case, the power supply may have to be stopped again after the power supply is started, but in case that the temperature rise value Tw is set to the value of a certain amount or more, it is possible to prevent the power supply from being stopped again at least immediately after the power supply is started.

On the other hand, in Step S011, when it is determined in the temperature determination section 14 that the relationship of kn<0 is not satisfied, it is determined that the present temperature Tn at the present time point tn is rising or maintained constant, and a power supply stop estimated time point tr is calculated at which the future temperature predicted at the time point tn reaches the temperature at which it is estimated that the power supply to the component parts of the in-vehicle camera unit has to be stopped (Step S017).

Herein, the power supply stop estimated time point tr can be expressed in the formula (7).

[Mathematical 7]

$$t_r = \frac{T_{th} - T_w - T_n}{k_n} \quad (7)$$

FIG. 12 shows the present temperature Tn at the present time point tn, the temperature gradient kn, the temperature rise value Tw of the in-vehicle camera unit 1 main body, and the relationship between the threshold temperature Tth at which to stop the power supply and the power supply stop estimated time point tr. In the same way as in FIG. 5, shown herein too is the case in which the number of samples is five.

Specifically, in Step S017, the temperature determination section 14 adds the temperature rise value Tw of the camera unit 1 main body, which is predicted by starting the power supply to the camera unit 1 main body, to the present temperature Tn at the present time point tn, and calculates the power supply stop estimated time point tr which reaches the time point at which it is estimated that, along with a rise in the initial temperature T0 (=Tn+Tw) along the temperature gradient kn (the upper side broken line of FIG. 12), the temperature of the component parts will exceed the threshold temperature Tth at which to stop the power supply.

The threshold temperature Tth at which to stop the power supply, based on the operation guarantee temperature of component parts, such as the imaging element and a microcomputer of the image processing section, which configure the in-vehicle camera unit, is set so as not to cause the camera unit to produce a failure or another problem. Herein, when the power supply stop estimated time point tr is set to a time point at which it is estimated, from the present temperature Tn at the present time point to and the temperature gradient n (the lower side broken line of FIG. 12), that the temperature of the component parts will exceed the threshold temperature Tth at which to stop the power supply, there is a possibility that when starting the power supply to the in-vehicle camera unit 1 main body, a temperature rise caused by the power consumption of the component parts of the camera unit causes the power supply stop estimated time point tr to be later than the time point at which the power supply actually has to be stopped, so that the initial temperature T0 (=Tn+Tw) wherein the temperature rise value Tw is added on top of the present temperature Tn at the present time point to is used instead of the present temperature Tn when calculating the power supply stop estimated time point tr using the temperature gradient kn. Thereby, the power supply stop estimated time point tr can be calculated more accurately.

Herein, in case that the present temperature Tn at the present time point tn falls sufficiently below the threshold temperature Tth at which to stop the power supply, there is no problem starting the power supply to the imaging section 2 and image processing section 3, but the power supply should not be started in case that the present temperature Tn exceeds the threshold temperature Tth at which to stop the power supply. Furthermore, even when the present temperature Tn falls below the threshold temperature Tth at which to stop the power supply, the power supply should not be started in case that due to the gradient of a temperature rise thereafter and to the influence of the heat generation of the in-vehicle camera unit 1 main body when the power supply is started, the present temperature Tn exceeds the threshold temperature Tth, at which to stop the power supply, just as soon as the power supply is started, resulting in that the power supply cannot help but be stopped.

Next, the temperature determination section 14 notifies the power supply control section 15 of the calculated power supply stop estimated time point tr (Step S018).

Next, the temperature determination section 14 determines whether or not the relationship of tr>tth is satisfied (Step S019). Herein, tth represents the start time point at which there is no problem starting the power supply to the component parts by the power supply stop estimated time point tr.

In Step S019, when it is determined in the temperature determination section 14 that the relationship of tr>tth is satisfied, the power supply control section 15 issues an instruction to the power supply section 16 so as to start the power supply to the imaging section 2 and image processing section 3 (Step S015). The power supply section 16, based on the instruction, starts the power supply to the imaging section 2 and image processing section 3 (Step S016). Thereby, it is possible to start the imaging and image processing operation of the imaging section 2 and image processing section 3.

Next, in Step S019, when it is determined in the temperature determination section 14 that the relationship of tr>tth is not satisfied, the procedure moves to Step S020, wherein an instruction is issued to the temperature data acquisition section 12 so as to acquire the present temperature Tn at the present time point tn from the temperature sensor 11 and store it in the memory section 17. In Step S021, n is counted up, and after standing by at the time interval tf (Step S022), the procedure moves to Step S010, wherein the temperature gradient kn is calculated again and renewed in the predicted temperature calculation section 13 and is stored in the memory section 17.

In Step S016, after the power supply to the imaging section 2 and image processing section 3 is started by the power supply section 16, the temperature determination section 14 causes the temperature data acquisition section 12 to stand by at the acquisition time interval tf (Step S023), and after that, to acquire the present temperature Tn at the present time point tn and store it in the memory section 17 (Step S024). In Step S021, n is counted up. Next, the temperature determination section 14 determines whether or not the acquired present temperature Tn and the threshold temperature Tth at which to stop the power supply satisfy the relationship of Tn≥Tth (Step S026).

In Step S026, when it is determined in the temperature determination section 14 that the relationship of Tn≥Tth is satisfied, that is, when it is determined therein that the present temperature Tn exceeds the threshold temperature Tth at which to stop the power supply, the power supply control section 15, in order to stop the power supply by the power supply section 16 to the imaging section 2 and image processing section 3, issues an instruction to the power supply section 16 so as to stop the power supply to the imaging section 2 and image processing section 3 (Step S027). The power supply section 16, based on the instruction, stops the power supply to the imaging section 2 and image processing section 3 (Step S028). After that, the procedure moves to Step S020.

On the other hand, in Step S026, when it is determined in the temperature determination section 14 that the relationship of Tn Tth is not satisfied, that is, when it is determined therein that the present temperature Tn has not exceeded the threshold temperature Tth at which to stop the power supply, the power supply by the power supply section 16 to the imaging section 2 and image processing section 3 is caused to continue, and the procedure returns to Step S023.

In this way, the temperature gradient kn is calculated from the present temperature Tn, a future temperature is predicted based on the temperature gradient kn, the power supply start estimated time point ts or the power supply stop estimated time point tr is calculated from the relationship between the predicted temperature and the threshold temperature Tth at which to start the power supply or the threshold temperature Tth at which to stop the power supply, and the start or stop of the power supply to the imaging section 2 and image processing section 3 is carried out with more appropriate timing, whereby it is possible, even in the environment with rapid changes in temperature, to prevent the temperature of the component parts of the camera unit from exceeding the operation guarantee temperature, and it is thus possible to protect the camera unit main body against a high temperature with appropriate timing.

In the first embodiment, the values Tth of the threshold temperature at which to start the power supply and of the threshold temperature at which to stop the power supply are the same, but may be set as being different values depending on temperature rise and fall characteristics.

Next, a description will be given, using the flowcharts shown in FIGS. 13 and 14, of two kinds of processing methods showing other working modes of the present embodiment.

First, a description will be given, with reference to the flowchart shown in FIG. 13, of a processing method which is of the first working mode. The above-described processing method is the method whereby the power supply start estimated time point ts at which to start the power supply is fixed and then standby is continued until the time point is reached (Step S014). However, for example, when a drop in the temperature gradient increases sharply during standby, the power supply is possible for a shorter time period than it should be, but the time point at which to start the power supply is fixed, so that it happens that standby continues for an extra time period. Alternatively, there has been the problem of not being able to respond in the same way to the case where a drop in temperature moderates during standby, or a drop in temperature stops, or also where a rise in temperature starts.

Figure 13:
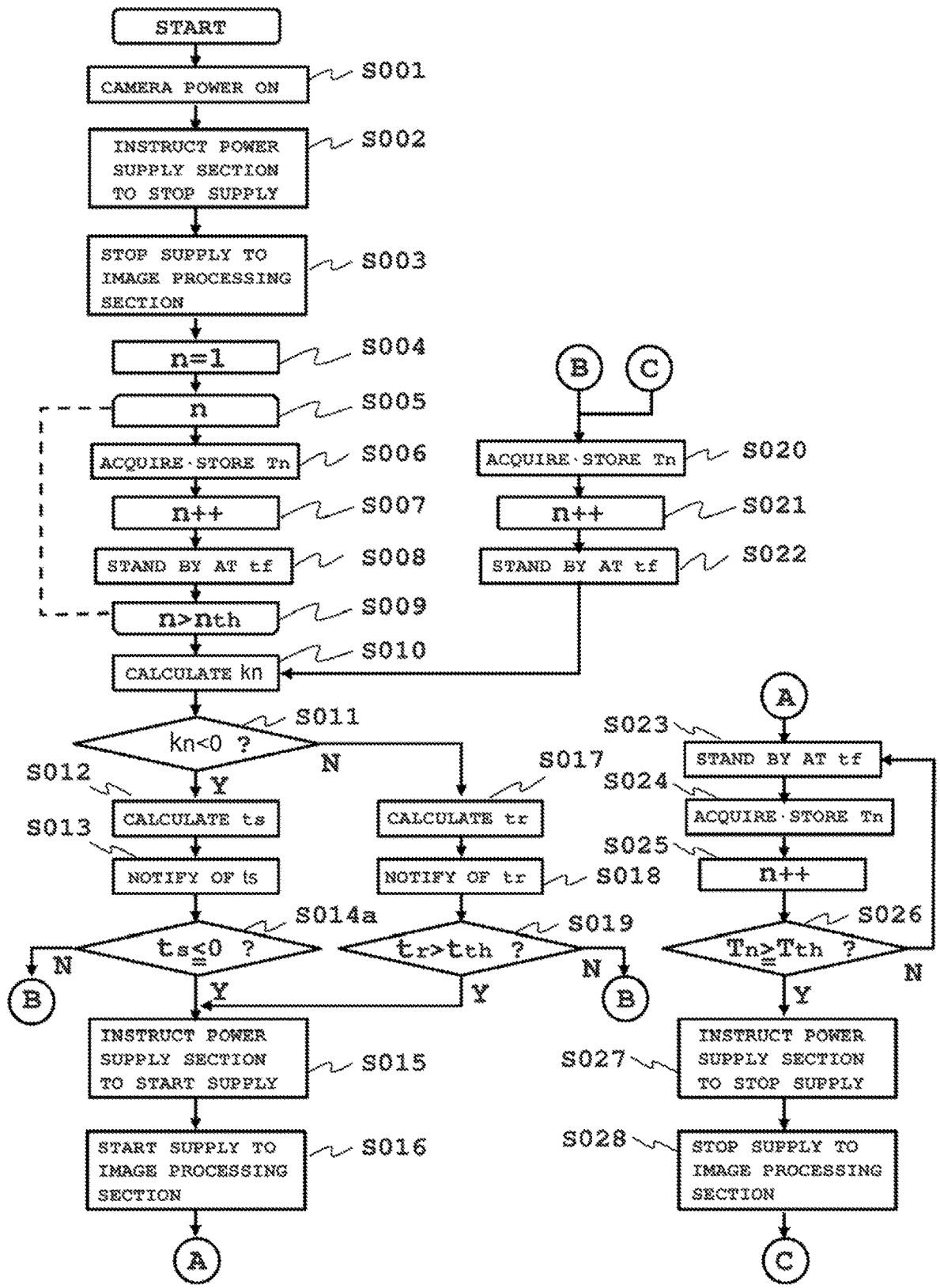
FIG. 13 is a flowchart showing the processing procedure of power supply control in another working mode of the power control apparatus for an in-vehicle camera according to the first embodiment.
Figure 14:
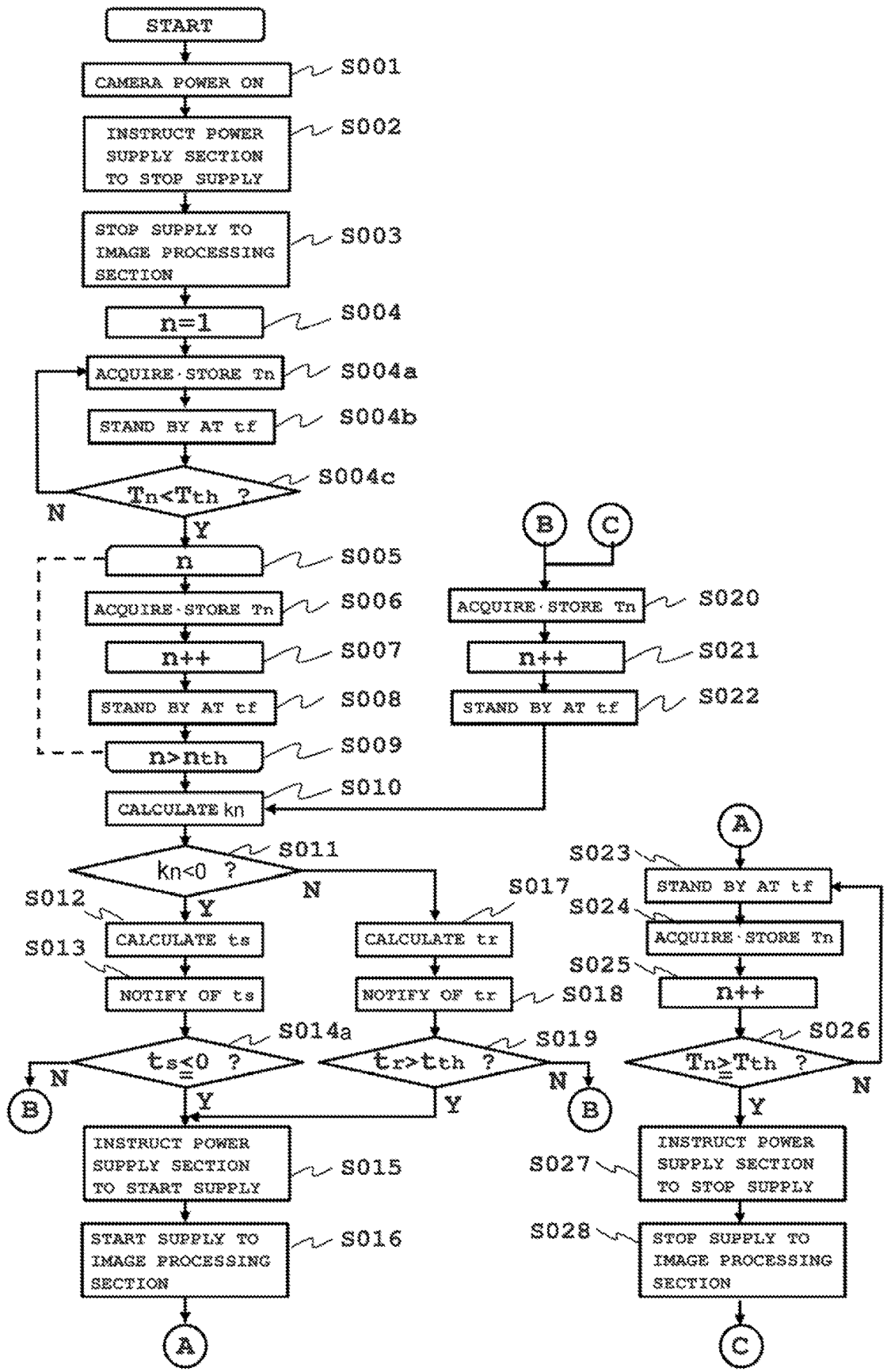
FIG. 14 is a flowchart showing the processing procedure of power supply control in still another working mode of the power control apparatus for an in-vehicle camera according to the first embodiment.

Hence, in consideration of these points, the method whereby the calculation processing of the temperature gradient kn is always repeatedly executed even during standby, thereby enabling a flexible response even to a change in the temperature gradient kn, is the processing method shown in FIG. 13. The difference from the above-described processing method is that Step S014 is changed to Step S014a. That is, the standby operation in Step S014 is changed, in Step S014a, to the processing of determining whether or not the power supply start estimated time point ts is zero or less. Herein, the changed processing is that when the power supply start estimated time point ts is not zero or less, the procedure returns to Step S020. That is, the method is that calculation of the temperature gradient kn is always repeatedly executed, even in the middle of temperature drop, until the power supply start estimated time point ts is reached, and the power supply start estimated time point ts continues to be renewed. By so doing, it is possible, by flexibly changing the standby time period, to respond even to the case where the temperature gradient kn changes during standby.

In the present processing, the time interval tf at which to acquire the temperature data from the temperature sensor 11 during standby may be made longer than at normal times. That is, another time interval different from the time interval tf set in the processing of Step S008 may be set in the processing of Step S022. This is because it is considered that a change in the temperature gradient kn during standby does not frequently occur, so that it is possible to reduce a processing load.

Next, a description will be given, with reference to the flowchart shown in FIG. 14, of a processing method which is of the second working mode. The processing method is that the temperature gradient kn is not calculated while the present temperature Tn exceeds the threshold temperature Tth at which to start the power supply, and the temperature gradient kn starts to be calculated only at the stage at which the present temperature Tn falls below the threshold temperature Tth at which to start the power supply, thereby reducing an extra processing load. The difference from in the first working mode is that the processing of Steps S004a to S004c is added. In the present second working mode, the temperature data acquisition section 12 first acquires the present temperature Tn (=T1) (Step S004a), and the temperature determination section 14, after standing by for the time interval tf (Step S004b), compares the value of Tn (=T1) and the threshold temperature Tth at which to start the power supply (Step S004c). When the value of Tn (=T1) exceeds the threshold temperature Tth at which to start the power supply, the procedure returns to the processing of Step S004a, wherein the acquisition of the present temperature Tn is repeated. It is not until when the value of the present temperature Tn (=T1) falls below the threshold temperature Tth at which to start the power supply, that the procedure first moves to the calculation processing of the temperature gradient kn in and after Step S005. By so doing, it is possible to minimize the calculation processing of the temperature gradient kn and thus to reduce the processing load.

Thus, according to the in power control apparatus for an in-vehicle camera and the power control method according to the first embodiment, there is an advantageous effect in that the temperature gradient is calculated based on the plurality of series of temperature data periodically acquired by the temperature sensor, thereby predicting the future temperature, and it is thus possible to implement the start or stop of the power supply with appropriate timing so as to cause the component parts of the camera unit to operate within the operation guarantee temperature, enabling the protection of the component parts of the camera unit when at high temperature to be carried out rapidly and accurately.

Second Embodiment

Figure 15:
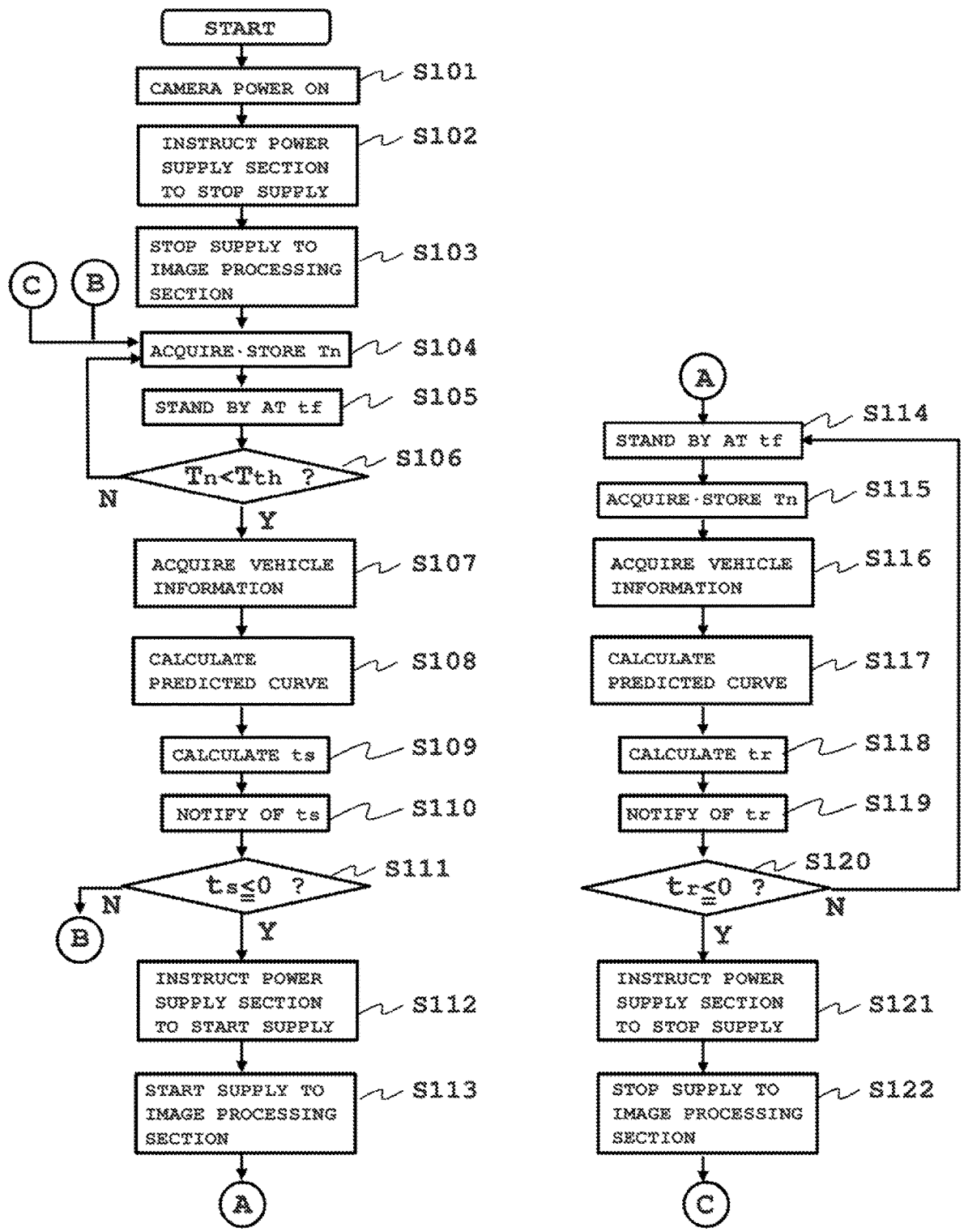
FIG. 15 is a flowchart showing the processing procedure of power supply control in a power control apparatus for an in-vehicle camera according to the second embodiment.

FIG. 15 is a flowchart showing the processing procedure of the power supply control in a power control apparatus for an in-vehicle camera according to the second embodiment. The configuration of the in-vehicle camera unit including the power control apparatus for an in-vehicle camera according to the second embodiment and the schematic configuration diagram of the power control apparatus for an in-vehicle camera are the same as in FIGS. 2 and 3, respectively, of the first embodiment, and so are omitted from description. The difference from in the first embodiment is that in the first embodiment, the future temperature is predicted by the temperature gradient kn calculated from the temperature data measured in the temperature sensor 11, while in the second embodiment, the prediction of the future temperature is carried out using the temperature data measured in the temperature sensor 11 and the vehicle operation information from the vehicle control apparatus 22.

The vehicle operation information includes vehicle operation, such as air conditioner ON/OFF operation, set values (wind power, set temperature) thereof, window open/close operation, seat heater ON/OFF operation, ventilation fan ON/OFF operation, defroster ON/OFF operation, and window washer operation, which constitutes the factors which affect a change in the temperature of the in-vehicle camera unit main body, and in addition, includes, for example, the information of the vehicle interior/exterior temperature measured by a temperature sensor attached to the vehicle main body, and furthermore, the information of the amount of solar radiation measured by a solar radiation sensor attached to the vehicle main body.

In the present embodiment, a predicted curve is calculated from the temperature data periodically acquired from the temperature sensor 11, carrying out the prediction of a future temperature, and it is determined whether or not the predicted temperature is within the temperature range which guarantees the operation of the component parts configuring the camera unit 1, based on the result of which the start or stop of the power supply to the component parts is carried out, thereby protecting the component pars of the camera unit 1 from a high temperature, thus suppressing the occurrence of a problem.

Next, a description will be given, with reference to the flowchart of FIG. 15, of the processing procedure of the power supply control of the power control apparatus for an in-vehicle camera according to the second embodiment.

First, in the same way as in Steps S001 to S003 of the first embodiment, in order to start the operation of the vehicle, the engine is started, and the power supply to the camera unit 1 is started (Step S101). Herein, the power supply to the camera unit control section 4 is carried out. Subsequently, the camera unit control section 4 causes the power supply control section 15 of the power control apparatus 10 for an in-vehicle camera to issue a command to the power supply section 16 in order to stop the power supply to the image processing section 3 (Step S102). After that, the power supply section 16 stops the power supply to the image processing section 3 (Step S103). The power supply to the imaging section 2 is stopped in conjunction with that to the image processing section 3.

As also described in the first embodiment, the purpose for this is to prevent the occurrence of a problem of the component parts caused by the fact that, assuming that there is the case in which the surrounding temperature and the temperature of the component parts of the camera unit 1 have turned to a high temperature due to long-term parking or the like, the power supply to the image processing section 3 and to the imaging section 2 including the imaging element is started in the high temperature environment, and thereby the high temperature exceeds the operation guarantee temperature. The power supply to the imaging section 2 and image processing section 3 may herein be stopped when only standby power is supplied, and neither imaging operation nor image processing operation is performed, keeping power consumption to a minimum, in the same way as in the first embodiment.

Next, the temperature data acquisition section 12 acquires the present temperature Tn from the temperature sensor 11 and stores it in the memory section 17 (Step S104). Subsequently, the temperature determination section 14, after standing by for the temperature data acquisition time interval tf (Step S105), compares the stored present temperature Tn and the threshold temperature Tth at which to start the power supply (Step S106). When the present temperature Tn has exceeded the threshold temperature Tth at which to start the power supply, the procedure returns to Step S104, and the temperature data acquisition section 12 newly acquires the present temperature Tn from the temperature sensor 11. When the present temperature Tn has not exceeded the threshold temperature Tth at which to start the power supply, the procedure moves to the processing in and after the next Step S107.

The processing in and after Step S107 is to acquire vehicle operation information from the vehicle control apparatus 22 of the vehicle 20 main body, to predict from the vehicle operation information how the temperature of the component parts of the camera unit 1 will change, and to estimate, from this predicted curve, the time point at which the temperature will be reached at which to allow the power supply to start.

Subsequently, the predicted temperature calculation section 13 acquires the vehicle operation information from the vehicle control apparatus 22 via the camera unit control section 4 (Step S107), predicts how the temperature of the component parts of the camera unit 1 will change, from the present temperature Tn obtained from both the vehicle operation information and the temperature sensor 11, and calculates the predicted curve (Step S108).

Herein, for example, as shown in FIG. 16, the correspondence table data wherein the vehicle operation information, what temperature, on which the component parts temperature is converged by the operation, and the time constant, which represents the information on the time period needed until when the component parts temperature reaches the convergence temperature, are correlated with each other, is stored in the memory device 17 in advance. For example, when an air conditioner is started with the set temperature set to 20° C. and the air volume set to large, the convergence temperature of the component parts of the camera unit can be predicted to reach 20° C. from a lapse of time, and the time period needed until the convergence temperature reaches this temperature can be calculated based on the time constant $\tau$. This kind of correspondence table data only has to be created in advance, for example, based on data which are actually measured in advance. The correspondence table data includes the convergence temperature and time constant information when the vehicle operation information other than air conditioner operation is generated, and when a plurality of items of vehicle operation occur, the method of predicting by adding all temperature change curves obtained by the items of operation may be adopted.

When the predicted curve is calculated by the predicted temperature calculation section 13, the temperature determination section 14, based on the estimated convergence temperature and time constant information, furthermore, on the threshold temperature Tth at which to start the power supply, and on the temperature rise value Tw of the camera unit 1 main body, calculates the power supply start estimated time point ts at which to start the power supply (Step S109).

Figure 17:
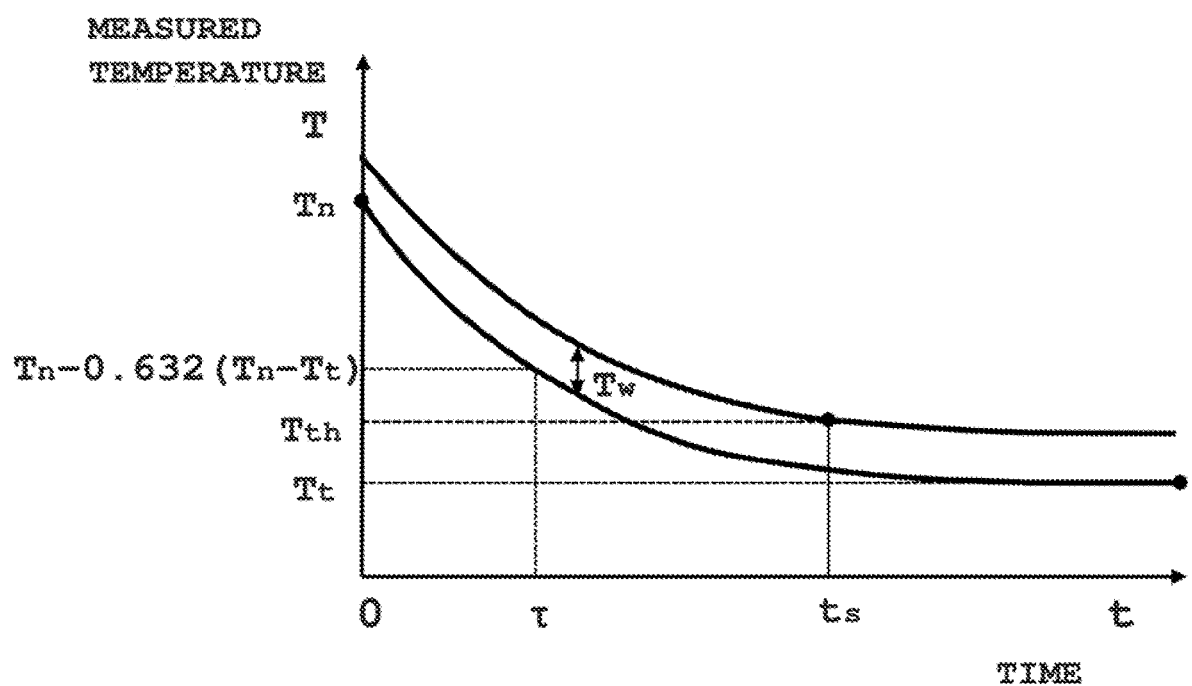
FIG. 17 is a diagram showing the relationship between a predicted curve of a temperature change and a power supply start estimated time point, in the second embodiment.

Herein, a detailed description will be given, using FIG. 17, of the method of calculating the power supply start estimated time point ts, which is being carried out in the processing Steps S108 to S109.

The predicted curve of the temperature change can be obtained from the present temperature Tn, convergence temperature Tt, and time constant $\tau$, as shown in FIG. 7. Herein, the time constant $\tau$ generally represents a thermal time constant which is a "time period needed until a change of 63.2% of the difference in temperature between the initial temperature and the final temperature" as shown in the drawing, and the predicted curve can be obtained from these items of information. In case that the predicted curve can be obtained, the power supply start estimated time point ts only has to be calculated from the threshold temperature Tth at which to start the power supply and from the temperature rise value Tw, as shown in the drawing, in the same way as in the first embodiment.

Next, the temperature determination section 14 notifies the power supply control section 15 of the calculated power supply start estimated time point ts (Step S110).

Next, the temperature determination section 14 determines whether or not the relationship of ts≤0 is satisfied (Step S111).

In Step S111, when it is determined in the temperature determination section 14 that the relationship of ts≤0 is satisfied, the power supply control section 15 stands by until the notified power supply start estimated time point ts. After that, the power supply control section 15 issues an instruction to the power supply section 16 so as to start the power supply to the imaging section 2 and image processing section 3 (Step S112). In response to the instruction, the power supply section 16 starts the power supply to the imaging section 2 and image processing section 3 (Step S113). Thereby, it is possible to start the imaging and image processing operation of the imaging section 2 and image processing section 3.

On the other hand, in Step S111, when it is determined in the temperature determination section 14 that the relationship of ts≤0 is not satisfied, the procedure returns to Step S104, wherein the predicted curve always continues to be renewed. Thereby, new vehicle operation occurs during standby, and it is possible to respond even though the predicted curve changes due to this temperature change.

Furthermore, a description will be given of the operations after starting the power supply (Steps S114 to S122).

The predicted temperature calculation section 13, after standing by for the time interval tf at which to acquire the temperature data (Step S114), acquires the present temperature Tn from the temperature sensor (Step S115). Furthermore, the predicted temperature calculation section 13, in the same way as in the processing from Step S107 to Step S108 before starting the power supply, acquires individual kinds of vehicle operation information from the vehicle control apparatus 22 (Step S116), and calculates, from the items of vehicle operation information and the present temperature Tn, the predicted curve which represents how the temperature of the component parts of the camera unit 1 changes (Step 3117).

Figure 18:
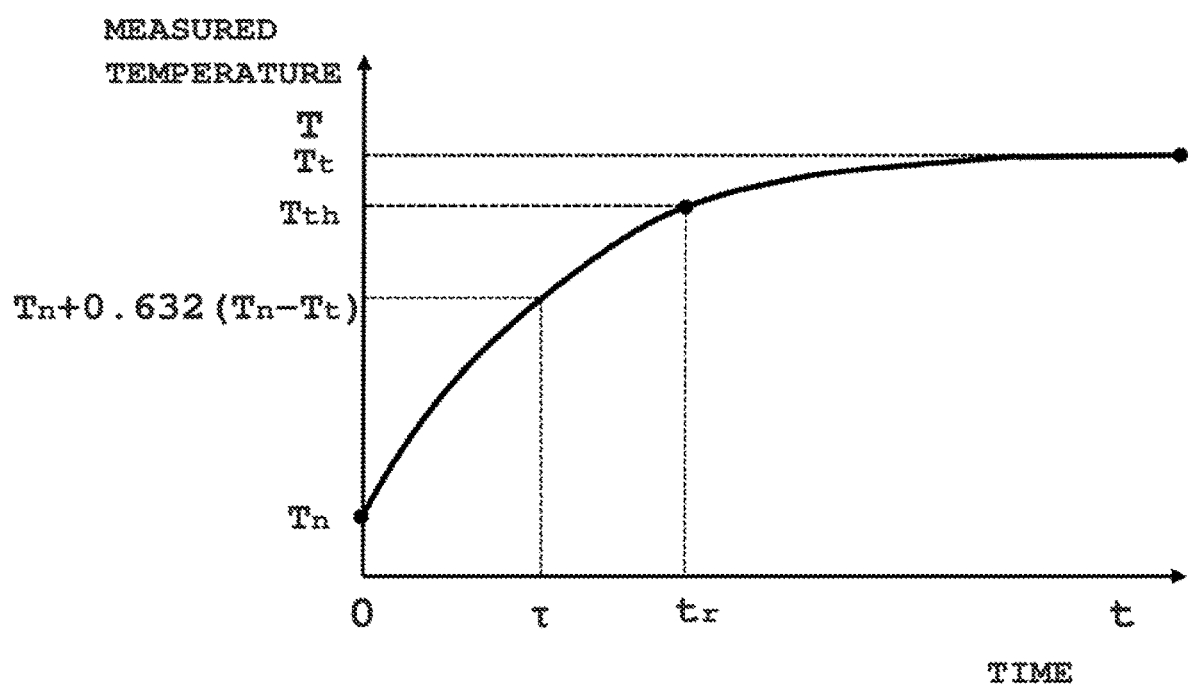
FIG. 18 is a diagram showing the relationship between a predicted curve of a temperature change and a power supply stop estimated time point, in the second embodiment.

After that, on the basis of the estimated convergence temperature and time constant information and furthermore of the present temperature Tn, the convergence temperature Tt, and the time constant τ, in the same way as when starting the power supply, as shown in FIG. 18, when the predicted curve is calculated by the predicted temperature calculation section 13, the temperature determination section 14, based on the threshold temperature Tth at which to stop the power supply and on the temperature rise value Tw of the in-vehicle camera unit main body, calculates the power supply stop estimated time point tr until when starting the power supply (Step S118). The temperature determination section 14 notifies the power supply control section 15 of the power supply stop estimated time point tr (Step S119).

Next, the temperature determination section 14 determines whether or not the relationship of tr≤0 is satisfied (Step S120).

In Step S120, when it is determined in the temperature determination section 14 that the relationship of tr≤0 is satisfied, the power supply control section 15 stands by until the notified power supply start estimated time point ts. After that, the power supply control section 15 issues an instruction to the power supply section 16 so as to stop the power supply to the imaging section 2 and image processing section 3 (Step S121). In response to the instruction, the power supply section 16 stops the power supply to the imaging section 2 and image processing section 3 (Step S122). Thereby, it is possible to stop the imaging and image processing operation of the imaging section 2 and image processing section 3.

On the other hand, in Step S120, when it is determined in the temperature determination section 14 that the relationship of tr≤0 is not satisfied, the procedure returns to Step S114, wherein the predicted curve always continues to be renewed. Thereby, new vehicle operation occurs during standby, and it is possible to respond even though the predicted curve changes due to this temperature change.

Alternatively, in order to minimize a failure risk caused by the power supply when the threshold temperature Tth at which to stop the power supply is exceeded, a configuration may be such that when the occurrence of vehicle operation causing a temperature rise, for example, of air conditioner OFF is detected at the stage where the vehicle operation information is acquired (S116), an instruction is issued to the power supply section 16 immediately at this time point so as to stop the power supply to the imaging section 2 and image processing section 3 (Step S121). In addition, as the vehicle operation causing a temporary rise, there are seat heater ON, window closing, and the like, other than air conditioner OFF.

Also, in the present embodiment, a temperature change is predicted based on the vehicle operation information, but the method may be adopted whereby temperature data from the temperature sensor is measured at a constant frequency, and a prediction error is periodically corrected utilizing the temperature data.

Thus, in the present second embodiment, a predicted curve is calculated from the temperature data acquired from the temperature sensor, carrying out the prediction of a future temperature, and it is determined whether or not the predicted temperature is within the temperature range which guarantees the operation of the component parts configuring the camera unit, based on the result of which, the start or stop of the power supply to the component parts is carried out, thereby protecting the component parts of the camera unit from a high temperature, thus suppressing the occurrence of a problem.

Thus, in the power control apparatus for an in-vehicle camera according to the second embodiment, the power supply start or power supply stop time point can be predicted from the present temperature and the time constant, so that it is possible, with a simple configuration, to expeditiously carry out the protection of the component parts of the camera unit when at high temperature.

In the description of the above-mentioned embodiments, a description has been given of the case of targeting the protection, by the temperature sensor, of the imaging element and the image processing section among the component parts of the in-vehicle camera unit, but only the imaging element and the parts of the image processing section are not necessarily the parts which most require the protection against a high temperature. Out of the parts configuring the in-vehicle camera unit, for example, starting with a lens, the imaging element, an image processing microcomputer, a control microcomputer, a memory, a power source, and other semiconductor chips, a most easily influenced part differs depending on the position in which it is disposed or on the operation guarantee operation temperature of the part. Hence, in consideration of these points, it is only necessary, when appropriate, to take the same measures as mentioned above by focusing on a part which most needs to be targeted to be protected.

A description has been given of the example in which the power control apparatus for an in-vehicle camera according to the present application is installed on the front windshield of the vehicle, but the present application can also be applied in the same way to the case of installing the apparatus on the rear window or another place of the vehicle.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

Also, in the drawings, the identical signs show the identical or equivalent portions.

REFERENCE SIGNS LIST 1 camera unit, 2 imaging section, 3 image processing section, 4 camera unit control section, 10 power control apparatus for in-vehicle camera, 11 temperature sensor, 12 temperature data acquisition section, 13 predicted temperature calculation section, 14 temperature determination section, 15 power supply control section, 16 power supply section, 17 memory section

The invention claimed is:

1. A power control apparatus for an in-vehicle camera, characterized by comprising:
    a temperature sensor which is installed inside a camera equipment of an in-vehicle camera and which measures the temperature of the camera equipment;
    a temperature data acquisition circuitry which periodically acquires temperature data from the temperature sensor;
    a predicted temperature calculation circuitry which, based on the temperature data, calculates a future predicted temperature of the camera equipment;
    a power supply circuitry which supplies power to component parts configuring the camera equipment;
    a temperature determination circuitry which determines whether or not the predicted temperature is within an operation guarantee temperature of the component parts; and
    a power supply control circuitry which, based on a result of the determination of the temperature determination circuitry, issues a control command to start or stop the power supply to the component parts from the power supply circuitry.

2. The power control apparatus for an in-vehicle camera according to claim 1, characterized in that
    the predicted temperature calculation circuitry calculates a temperature gradient from a plurality of items of the temperature data, and based on the temperature gradient, calculates a future predicted temperature.

3. The power control apparatus for an in-vehicle camera according to claim 2, characterized in that
    the temperature determination circuitry determines using a power supply start estimated time point and a power supply stop estimated time point which are calculated based on the temperature gradient and on a temperature rise amount when starting the power supply.

4. The power control apparatus for an in-vehicle camera according to claim 1, characterized in that
    the predicted temperature calculation circuitry calculates a temperature change curve of the component parts by utilizing the temperature data and vehicle operation information which is provided from a vehicle main body, and calculates a future predicted temperature based on the temperature change curve.

5. The power control apparatus for an in-vehicle camera according to claim 4, characterized in that
    a convergence temperature and a time constant are utilized to calculate the temperature change curve of the component parts.

6. The power control apparatus for an in-vehicle camera according to claim 4, characterized in that
    the vehicle operation information includes at least one of a vehicle interior temperature, a vehicle exterior temperature, a vehicle speed, an amount of solar radiation, air conditioner power operation and a set value thereof, window open/close operation and a set value thereof, seat heater power operation, ventilation fan power operation, defroster power operation, and window washer operation.

7. The power control apparatus for an in-vehicle camera according to claim 5, characterized in that
    the vehicle operation information includes at least one of a vehicle interior temperature, a vehicle exterior temperature, a vehicle speed, an amount of solar radiation, air conditioner power operation and a set value thereof, window open/close operation and a set value thereof, seat heater power operation, ventilation fan power operation, defroster power operation, and window washer operation.

8. An power control method for an in-vehicle camera, characterized by comprising:
    measuring the temperature of a camera equipment of an in-vehicle camera by a temperature sensor installed inside the camera equipment, periodically acquiring temperature data from the temperature sensor, calculating a future predicted temperature of the camera equipment based on the temperature data, determining whether or not the predicted temperature is within an operation guaranteed temperature range of component parts of the camera equipment, and carrying out the start or stop of the power supply to the component parts based on the determination.

9. The power control method for an in-vehicle camera according to claim 8, characterized in that
    a temperature gradient is calculated from a plurality of items of the temperature data, and the predicted temperature is calculated based on the temperature gradient.

10. The power control method for an in-vehicle camera according to claim 9, characterized in that
    the determination is made using a power supply start estimated time point and a power supply stop estimated time point which are calculated based on the temperature gradient and on a temperature rise amount when starting the power supply.

11. The power control method for an in-vehicle camera according to claim 8, characterized in that
    a temperature change curve of the component parts is calculated utilizing the temperature data and vehicle operation information which is provided from a vehicle main body, and the predicted temperature is calculated based on the temperature change curve.

12. The power control method for an in-vehicle camera according to claim 11, characterized in that
    a convergence temperature and a time constant are utilized to calculate the temperature change curve of the component parts.

13. The power control method for an in-vehicle camera according to claim 11, characterized in that
the vehicle operation information includes at least one of a vehicle interior temperature, a vehicle exterior temperature, a vehicle speed, an amount of solar radiation, air conditioner power operation and a set value thereof, window open/close operation and a set value thereof, seat heater power operation, ventilation fan power operation, defroster power operation, and window washer operation.

14. The power control method for an in-vehicle camera according to claim 12, characterized in that
the vehicle operation information includes at least one of a vehicle interior temperature, a vehicle exterior temperature, a vehicle speed, an amount of solar radiation, air conditioner power operation and a set value thereof, window open/close operation and a set value thereof, seat heater power operation, ventilation fan power operation, defroster power operation, and window washer operation.

* * * * *